United States Patent
Yahil

(10) Patent No.: US 9,279,887 B2
(45) Date of Patent: Mar. 8, 2016

(54) SELF-SIMILAR, TRANSVERSELY SHIFT-INVARIANT POINT RESPONSE FUNCTION IN SINGLE PHOTON EMISSION COMPUTED TOMOGRAPHY

(71) Applicant: Siemens Medical Solutions USA, Inc., Malvern, PA (US)

(72) Inventor: Amos Yahil, Stony Brook, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/588,995

(22) Filed: Jan. 5, 2015

(65) Prior Publication Data

US 2015/0192683 A1 Jul. 9, 2015

Related U.S. Application Data

(60) Provisional application No. 61/924,307, filed on Jan. 7, 2014.

(51) Int. Cl.
*G01T 1/10* (2006.01)
*G01T 1/164* (2006.01)
*G06T 11/00* (2006.01)

(52) U.S. Cl.
CPC .............. *G01T 1/1647* (2013.01); *G06T 11/00* (2013.01)

(58) Field of Classification Search
CPC .............................. G01T 1/1647; A61B 6/037
See application file for complete search history.

(56) References Cited

U.S. PATENT DOCUMENTS

2014/0341453 A1* 11/2014 Hsu ...................... A61B 6/5264
382/131

OTHER PUBLICATIONS

Beekman et al., "Fast SPECT simulation including object shape dependent scatter," Jun. 1995, IEEE Transactions on Medical Imaging, vol. 14, No. 2, pp. 271-282.*
GE Healthcare,"Evolution for Bone™ Collimator-Detector Response Compensation in Iterative SPECT Imaging Reconstruction Algorithm," pp. 1-6, 2005.
X. Zhang, et al., "Implementing analytical geometric and penetration response correction for keel-edge pinhole SPECT image reconstruction," Faculty of Engineering and Information Sciences, University of Wollongong, Research Online, pp. 1-7, 2008.
S. Y. Chun, et al., "Correction for Collimator-Detector Response in SPECT Using Point Spread Function Template," IEEE Trans Med Imaging, 32(2), pp. 1-24, 2013.

* cited by examiner

*Primary Examiner* — Kiho Kim
(74) *Attorney, Agent, or Firm* — Peter Kendall

(57) ABSTRACT

A point response function (PRF) is estimated in SPECT. A 3D PRF is based on measured emissions from a point source at different distances from the detector. Rather than sampling every location in space, the 2D PRFs at a sub-set of distances are sampled. The 3D PRF is then modeled with a representative 2D PRF and a scale as a function of distance. For a given distance from the detector, the 2D PRF to be applied is formed by scaling the representative 2D PRF using the scale for that distance.

20 Claims, 3 Drawing Sheets

SELF-SIMILAR, TRANSVERSELY SHIFT-INVARIANT POINT RESPONSE FUNCTION IN SINGLE PHOTON EMISSION COMPUTED TOMOGRAPHY

RELATED APPLICATIONS

The present patent document claims the benefit of the filing date under 35 U.S.C. §119(e) of Provisional U.S. Patent Application Ser. No. 61/924,307, filed Jan. 7, 2014, which is hereby incorporated by reference.

BACKGROUND

The present embodiments relate to characterizing a point response function (PRF) in single photon emission computed tomography (SPECT). A PRF is the image formed on a detector by a point source in the absence of appreciable attenuation and scatter between the source and the detector. The PRF is used in reconstruction. For reconstructing emissions from a patient, the PRF as a function of location is used. When imaging a finite source (e.g., a patient), the image of function of the patient is generated as a convolution of the PRF with the emissivity (e.g., detected emissions) of the finite source as a function of position.

A three-dimensional (3D) PRF is used to characterize the SPECT imaging systems since the source is close to the detector. The 3D PRF is typically modeled. One simple example is a Gaussian function. The model may be based on emission measurements from a point source, but is an approximation limited in transverse extension and may not properly account for a tail of the PRF. For example, the PRF of the LEHR collimator with Tc-99m used by the Flash3D reconstruction misses ~20% of the total PRF. Even an effective-aperture model may still miss ~10% of the PRF in the tail.

The desired accuracy of a 3D PRF depends on the application. For quantitative imaging, which aims to measure an amount of uptake or other characteristic in a volume of interest, the accuracy is desired to be better than 10%, such as aiming for a goal ~1%. Since the 3D PRF used in reconstruction contributes to the accuracy, the 3D PRF should have the same or similar accuracy demanded of the image. However, the models for PRF, even when based on measurements, do not achieve such accuracy. The 3D PRF may be measured instead such that the response at each location in 3D is provided in tabular form. However, extensive effort is needed to measure a 3D tabular PRF, and the resulting large number of samples (one for each location in 3D) may be difficult to handle in practical image reconstruction.

BRIEF SUMMARY

By way of introduction, the preferred embodiments described below include methods, systems, and non-transitory computer readable media for estimating a PRF in SPECT. A 3D PRF is based on measured emissions from a point source at different distances from the detector. Rather than sampling every location in space, the 2D PRFs at a sub-set of distances are sampled. The 3D PRF is then modeled with a representative 2D PRF and a scale as a function of distance. For a given distance from the detector, the 2D PRF to be applied is formed by scaling the representative 2D PRF using the scale for that distance.

In a first aspect, a method is provided for estimating a point response function in SPECT. A detector of a SPECT system obtains point response functions of a point source at different distances from the detector. A polynomial is fit to a characteristic of the point response functions as a function of the distances. The scale is modeled as a function of distance with the polynomial as fit to the point response functions. The point response functions are composited, resulting in a two-dimensional composite point response function. A three-dimensional point spread function of the detector is represented by the two-dimensional composite point response function and the modeled scale as the function of distance.

In a second aspect, a non-transitory computer readable storage medium has stored therein data representing instructions executable by a programmed processor for estimating a point response function in SPECT. The storage medium includes instructions for: loading, for a collimator and an isotope, a self-similar two-dimensional point spread function and a polynomial of scale as a function of depth from a detector of a SPECT imager; calculating a point spread function at a depth from the self-similar two-dimensional point spread function and the polynomial of scale as a function of depth; and applying the point spread function in SPECT reconstruction by the SPECT imager.

In a third aspect, a system is provided for estimating a point response function in SPECT. A single photon emission computed tomography scanner is configured to reconstruct with a three-dimensional point spread function representing detector response as a function of a collimator and an isotope. A processor is configured to determine the three-dimensional point spread function from a two-dimensional point spread function and a plurality of scales for different distances from the detector. The three-dimensional point spread function is represented as a plurality of planes, where each of the planes is represented by the two-dimensional point spread function scaled by the scale for the distance from the plane to the detector.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A self-similar, transversely shift-invariant, 3D PRF is measured and applied. Rather than measure the 3D PRF at each distance, the 3D PRF is characterized accurately enough (e.g., ~1%) by a self-similar 2D image or PRF, which is scaled by a distance-dependent function to provide the actual 3D PRF.

Figure 1:
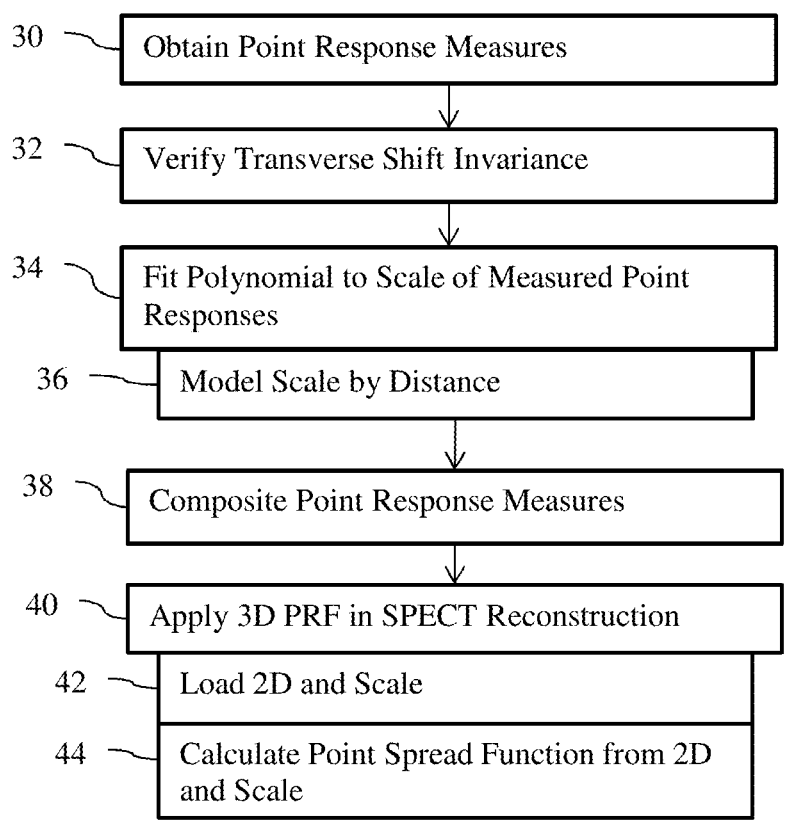
FIG. 1 is a flow chart diagram of one embodiment of a method for estimating a PRF in SPECT.

FIG. 1 shows one embodiment of a method for estimating a PRF in SPECT. The method includes (1) creation of the representative 2D PRF and scaling as a function of distance to model the 3D PRF and (2) application of the PRF model in reconstruction. In other embodiments, only the creation or only the application is provided. The creation may result in a PRF model that is usable in many different SPECT systems, such as any using a same detector and collimator configuration for detecting emissions from a same isotope. Variations may be provided, such as using a PRF modeled for one collimator, detector, and/or isotope for a different but similar collimator, detector, and/or isotope. In other embodiments, the creation is for a specific SPECT system that also applies the PRF.

Additional, different, or fewer acts may be performed. For example, acts 30-38 are directed to creation, and acts 40-44 are directed to application, so only one of these groups of acts is used. As another example, the loading of act 42 is not provided, such as where the 3D PRF is already cached. In yet another example, the compositing of act 38 is replaced with a PRF selection, such as selecting the PRF measured at a given distance. As another example, act 32 is not performed, such as assuming transverse shift invariance. Other acts may be added, such as acts for performing SPECT for a patient (e.g., configuring the SPECT system and/or generating a SPECT image).

The acts are performed in the order shown or a different order. For example, act 38 is performed prior to acts 34 and 36.

In act 30, PRF measures are obtained. The measurements are directly output by the detector or are acquired as previously performed measures through network transfer or upload.

The PRF measures are obtained with a detector. Rather than modeling from geometry or physics, actual measures of emissions from a point source are performed. The detector with a specific collimator is used to detect response to a point source. Emissions are detected with a gamma camera, for example. The detector is a planar or curved surface with a plurality of crystals and corresponding detection cells for detecting incident gamma photons over the 2D surface.

Any point source may be used. The point source is 1 mm$^3$ in one embodiment, but may be larger or smaller. The point source is for a given isotope. Any isotope may be used.

Figure 2:
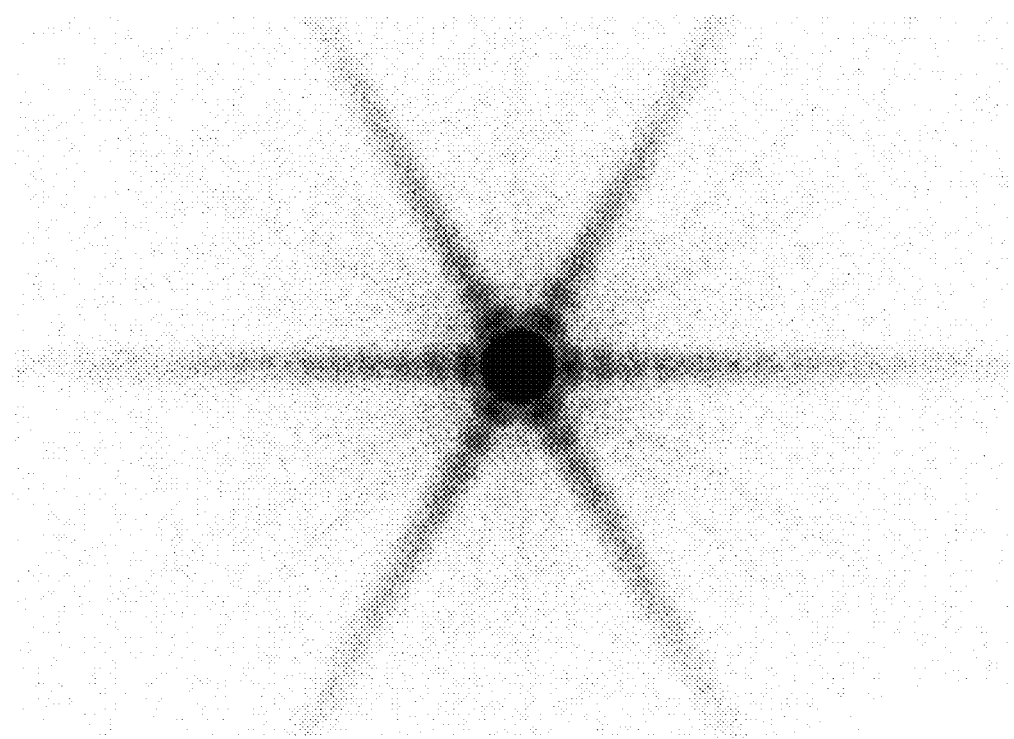
FIG. 2 is an example PRF.

FIG. 2 shows one example PRF. Each pixel or location in 2D represents an intensity or magnitude of detection from the point source over a period of time. The dark region in the center represents a maximum response of the detector. The six tails or rays of higher intensity regions are provided in the example of FIG. 2. Different types of collimators may block or reflect different amounts of the emissions from the point source, resulting in a different PRF.

The PRF is measured separately at different distances of the point source from the detector. The point source is positioned at a given distance from the detector, and the PRF is measured. The point source is then placed at a different distance or depth from the detector, and the PRF is again measured. Any number of distances may be used, such as tens or hundreds. The number is less than all of the distances used for 3D SPECT imaging. For example, the SPECT system reconstructs into an object space with 356 planes at different distances. The PRF is measured at half or fewer of these different distances, such as at 4, 16, 64, or 128 distances.

The detector response to the point source at each distance is read out. After reading the PRF, the detector is cleared, and the measurement repeated with the point source at a different distance. PRF images of the point source are obtained at a number of distances between the source and the detector. The PRF images serve as the basic input to the 3D PRF model.

"Image" is used for a frame of data representing capture from the detector and may or may not be displayed for viewing.

The images or measured PRF data from the detector used for the further acts below may first be processed. For example, the PRF measurements are smoothed or spatially low pass filtered in two-dimensions on a scale small with respect to the width of the PRF. The smoothing may reduce noise. For example, in a SPECT system, the images are smoothed over the scale of a single hole plus septal width.

Effects that are not transversely shift invariant may be suppressed. In one embodiment, the image is divided into quads or other sections. The quads or sections are averaged over quad or together to remove transverse (e.g., in plane) variance. The images are "folded over" lines of symmetry and filtered across sections to reduce or remove inter-section differences.

In optional act 32, the transverse shift invariance of the measured PRFs is verified. The 2D PRF is expected to have little variance resulting from the point source being at different locations in a plane parallel to the detector. If the plane is defined as x and y dimensions, with the distance of the plane to the detector being the z dimension, the point source may have any x and y location yet result in a similar or same PRF measurement. X, y, and z are orthogonal directions.

To test for transverse (e.g., x and y) shift invariance of the PRFs, the point source is imaged at a plurality of different transverse locations for one the distances. The test may be performed for just the one or for other distances as well.

The PRFs of a same distance but different transverse locations are tested for folding symmetry. The measured PRF images are verified to have the desired accuracy over their shifted overlap area. The verification is performed only for locations represented in both or all of the PRF measurements from the source at different locations. Within that overlapping region, folding symmetry is tested. The sum of absolute differences, correlation, or other measure of similarity is used to determine that the PRF measurements are sufficiently similar despite the transverse placement of the point source. Individual PRF images may be tested for folding symmetry as well. The PRF measurements are folded and differences deviating from symmetric are calculated.

If the transverse shift results in variance above a threshold, then a different PRF model may be used. Otherwise, the 3D PRF model using measured 2D PRF with a distance dependent scaling function is used.

In act 34, a polynomial is fit to a characteristic of the PRFs from the different distances. The 2D PRFs from different depths are similar but may be different in scale or other characteristic. Some are expanded or contracted relative to each other, so the spatial scaling in the two dimensions is different. The scale is the same in both x and y dimensions, but separate scaling may be determined for the different dimensions.

The scaling is not simply proportional to distance, as would be expected for a simple geometric PRF. Some of the physical effects causing the PRF may not scale simply with distance. For example, in a SPECT system, septal penetration of the collimator may be more complex. Additionally, the measured PRF images include the effect of intrinsic detector resolution, which does not depend on the distance of the point source. So, it is desirable to have a more general function characterizing the scaling relation.

The polynomial is fit to the scale of the measured PRFs. The coefficients of the polynomial are determined by fitting the data. Differences in data as a function of distance are used to find a continuous representation of relative scale as a function of distance. Discontinuous functions may be used. Other curves or relationships than polynomial may be used.

To fit the polynomial, the widths of the PRFs are calculated. For each PRF, a width is determined. The widths of the PRF images serve as the input data to determine the distance-dependent scaling (i.e., the widths represent scale). Other characteristics of the PRF may be used for fitting, such as an area of intensity above a threshold.

Any width calculation may be used. In one embodiment, a full width at half maximum (FWHM) is calculated. The peak intensity is located. The intensities at ½ or other fraction of the peak intensity define a contour. The maximum, minimum, average, or other width (e.g., radius or diameter) of the contour is used as the width. In another embodiment, a ratio of moments of the image intensity are used. For example, the width, w, is given by:

$$w \equiv \sum_{i,j} I_{i,j} \bigg/ \left(\sum_{i,j} I_{i,j}^2\right)^{1/2}$$

where I is the image intensity of the PRF measurements, and i and j run over the pixels in the x and y dimensions. Other ratios of moments may be used.

The ratio of the moments accounts for the entire PRF, not just the upper half as is done in FWHM. The ratio of the moments may be less susceptible to statistical fluctuations in the peak intensity, which determines the position of the half-maximum level in the measurement of the FWHM.

A width is provided for each of the distances for which the 2D PRF is measured. The polynomial is fit to these widths as a function of distance. The polynomial defines a curve with a different value at different distances. Any polynomial may be fit, such as first, second, or third order polynomial. Since a linear fit may not achieve the desired accuracy, a quadratic polynomial is fit in one embodiment. The quadratic polynomial fit to the widths over distance may adequately represent the scale over distance. Polynomials with a greater order may be used.

In act 36, the scale is modeled as a function of distance with the polynomial. The polynomial as fit to the widths indicates a relative difference from a reference, such as chosen distance. This relative difference provides a scale. The scale indicates the amount of spatial expansion or contraction of the locations represented by the PRFs of different depths to be the same as the locations of the reference depth. The expansion or contraction is in two dimensions, but may be only in one dimension or use separate scale values for the different dimensions. The intensities are not scaled, but may be. The scale is spatial. The coefficients of the fit polynomial or the polynomial itself indicate a scale value. The difference from the reference is itself the scale value, or the scale value is mapped from the difference.

The polynomial is fit to the widths of the measured PRFs. This polynomial provides scaling information for those PRFs at the distances for which measurements occurred. For other distances, the polynomial also provides scales. Scaling is provided for all of the distances from the detector to be used for 3D PRF, even if a PRF is not directly measured for those other distances. Scale values are indicated for each distance of the 3D PRF, including the distances at which the PRF is measured and other distances.

In act 38, the PRF measurements are composited. A representative 2D PRF to be used for the 3D PRF is created. Compositing is one approach. In alternative embodiments, one of the 2D PRF measurements is selected. For example, the 2D PRF image with the greatest similarity to the other measured 2D PRFs is selected. As another example, the 2D PRF image for a given measured depth is selected.

For compositing, the 2D PRFs measured by the detector are scaled to a common reference or depth. The modeling of the scaling is used to scale. All or a sub-set of the 2D PRFs measured by the detector are used. Of the 2D PRFs being used, all but one are scaled to the depth of the one. The one not being scaled is at the reference distance. Others may not be scaled, such as where the polynomial indicates equal or the same scale for the reference distance and another distance.

Once scaled, the 2D PRFs are combined. Any combination may be used, such as summing or averaging. Where the scaling causes locations in one 2D PRF to not be represented in another 2D PRF, the averaging accounts for this. The fields of view change due to the scaling, so the number of contributing PRFs to the combination at a given location may be greater or lesser than in other locations. The normalizing term of the average or other combination function accounts for this difference.

The result of compositing or selection is a 2D point response function. For example, a composite 2D PRF is provided. This composite 2D PRF is representative for the entire 3D PRF, except for distance dependent scaling. The 3D PRF of the detector is represented by the 2D composite or other representative PRF and the modeled scale as a function of distance. To determine the PRF of a given distance, the 2D composite or other representative PRF is scaled using the modeled scale for that distance. The composite or representative 2D PRF serves as a self-similar 2D image defining the 3D PRF. The same 2D PRF is used for all distances (i.e., same PRF in x and y for each distance) but with variation in scale by distance. The 3D PRF is obtained by simply scaling the composite or representative 2D PRF back to the appropriate distance of each plane of the 3D PRF.

To verify the accuracy of this 3D PRF model based on measured PRF, the 3D PRF thus obtained is compared with the original measured PRF images from the sub-set of distances or from all the distances. In one embodiment for SPECT systems, the 2D PRFs for the different distances as measured and as created by scaling the representative 2D PRF agree to ~1%.

In act 40, the 3D PRF is applied in reconstructions of emissions from patients. The 3D PRF is used to reconstruction the object space (i.e., patient function) from detected emissions. The 3D PRF is used in the reconstruction iteration to determine the locations within the patient from which the emissions originate. Any reconstruction may be used.

The reconstruction is in the same SPECT system used to measure 2D PRFs for creating the 3D PRF model or a different SPECT system. If a different SPECT system, the same collimator construction (e.g., same type of collimator) and same isotope are used. The 3D PRF is specific to the collimator construction, isotope, and/or detector types. Other SPECT systems with the same collimator construction and detector type imaging based on the same isotope may use the 3D PRF. Different 3D PRFs are modeled for different collimator constructions, different detectors, and/or different isotopes.

Acts 42 and 44 represent one approach for applying the 3D PRF in SPECT reconstruction. Other approaches may be used with the same or different acts.

In act 42, a self-similar 2D PRF and a polynomial of scale as a function of depth from a detector of a SPECT imager are loaded. Where different self-similar 2D PRF and/or scale are provided for different types of collimators and/or isotopes, the appropriate ones are loaded.

The self-similar 2D PRF and scale model are stored in a memory and loaded from the memory for use in reconstruction. Alternatively, the 2D PRF and scale are already stored in cache, received in a transfer, or otherwise useable in reconstruction without loading.

In act 44, a PRF at a distance or depth from the detector is calculated. Multiple PRFs at respective multiple depths are calculated to provide the 3D PRF used in reconstruction. The same self-similar 2D PRF is used to calculate the PRFs at different depths from the detector.

The PRFs at the different depths are calculated using the scaling, such as the polynomial of scale as a function of depth. The self-similar 2D PRF is associated with one depth, such as the depth used to composite the self-similar 2D PRF. The polynomial values for the different depths are compared to the value at that depth. The difference indicates an amount of scaling. The polynomial may be normalized so that the depth of the self-similar 2D PRF has a value of 1.0, and the values at other depths are the scale value itself (e.g., 1.1 to expand or 0.095 to contract). Alternatively, the difference or the polynomial value for each depth is used to look-up the scale value.

To calculate the PRF at a given depth, the self-similar 2D PRF is scaled. The result of the scaling is a 2D PRF for a plane. The 2D PRFs for each of multiple planes are created by scaling according to the scaling values for those planes where each plane is at a different depth from the detector. By scaling the self-similar 2D PRF for multiple planes (e.g., parallel planes at different distances from the detector), the 3D PRF is created.

The 3D PRF is applied in SPECT reconstruction by the SPECT imager. The PRF for each of a plurality of depths is used in reconstruction. Rather than measuring and storing the 3D PRF, the self-similar 2D PRF and the scaling as a function of distance is used to create and apply the 3D PRF as needed.

For reconstruction, the activity concentration (e.g., quantitative SPECT) is reconstructed using a system matrix. An object, distribution of emissions in a volume, or image data is reconstructed from the detected emissions. The quantity or amount of uptake for each location (e.g., voxel) is estimated as part of the reconstruction in computed tomography. The SPECT imaging system estimates the activity concentration of an injected radio-pharmaceutical or tracer for the different locations. In quantitative SPECT, the goal is to estimate the activity concentration in kBq/ml of the tracer (i.e., isotope) that was injected into and distributed within the patient.

The acquired data is used for reconstruction of an emission tomography representation of the volume. The reconstruction is iterative and contains a model of the imaging formation physics as a pre-requisite of quantitative reconstruction. The image formation model includes the detected data (e.g., counts), the system matrix, isotope properties, and biology. The system matrix represents mechanical properties of system, but may include other information (e.g., injection time and patient weight as represented by SUV).

Reconstruction includes a projection operator that is able to simulate a given SPECT system or SPECT class. Any now known or later developed reconstruction methods may be used, such as based on Maximum Likelihood Expectation Maximization (ML-EM), Ordered Subset Expectation Maximization (OSEM), penalized weighted least squares (PWLS), Maximum A Posteriori (MAP), multi-modal reconstruction, NNLS, or another approach.

The reconstruction uses the system matrix representing various aspects of the detection of the emissions, including modeling the imaging physics. The imaging physics includes aspects of the SPECT system, such as calibration of the SPECT system. The system matrix includes a model of the collimator allowing for distance dependent point spread function in three dimensions and thus 3D resolution recovery (i.e., the 3D PRF is included in the system matrix). For quantitative reconstruction (e.g., estimating activity concentration, such as in Bq/ml), the system matrix also includes within the reconstruction in image space the knowledge of collimator sensitivity, calibration factors, and view time. The variables for these considerations are part of the imaging physics, so are included in the system matrix.

Figure 3:
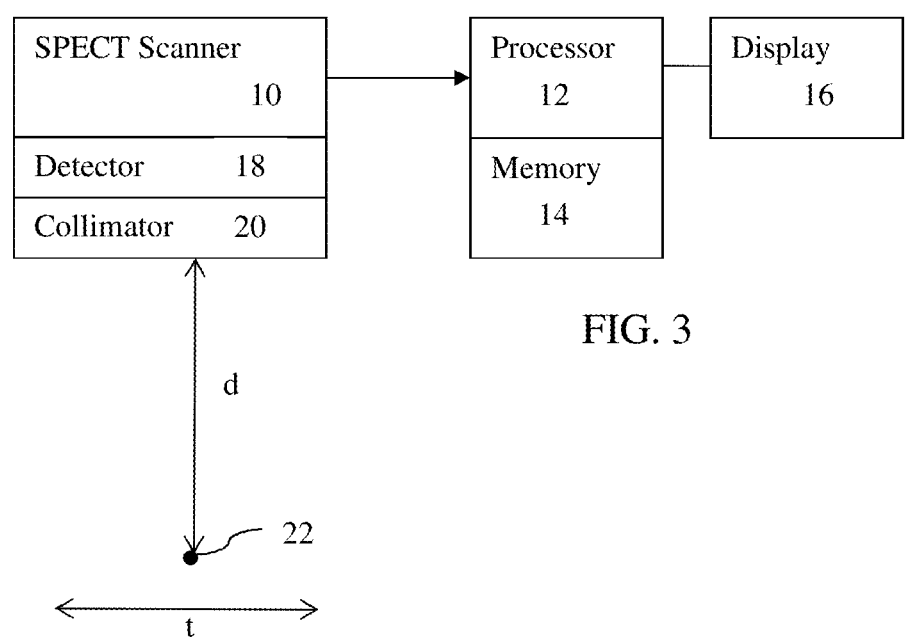
FIG. 3 is a block diagram of a system, according to one embodiment, for estimating a PRF in SPECT.

FIG. 3 shows a system 10 for estimating a PRF in SPECT. The system 10 includes an SPECT scanner 10, a processor 12, a memory 14, and a display 16. The processor 12, memory 14, and/or display 16 are part of the SPECT scanner 10 or are separate (e.g., a computer or workstation). Additional, different, or fewer components may be provided. For example, the system is a computer without the SPECT scanner 10. As another example, user input, patient bed, or other SPECT related devices are provided. Other parts of the system may include power supplies, communications systems, and user interface systems.

The SPECT scanner 10 is a SPECT system. As a SPECT system, a detector 18 and collimator 20 are provided. The detector 18 is a gamma camera connected with a gantry. The gamma camera is a planar photon detector, such as having crystals or scintillators with photomultiplier tubes or other optical detector. The gantry rotates the gamma camera about the patient. The emission events are detected with the camera at different positions or angles relative to the patient. For PRF measurements from a point source 22 at a distance d from the detector 18, the gamma camera may be stationary.

The collimator 20 forms a plurality of holes with septal plates or walls. The collimator 20 is formed of lead or other material that blocks some or all photons from one or more angles. Any collimator 20 may be used.

The SPECT scanner 10, using the detector 18, detects emissions from the point source 22 for estimating the PRF. The point source 22 may be at any position in the 2D transverse direction, t, relative to the detector 18, but is preferably centered. The emissions are measured with the point source 22 at different distances, d.

For imaging uptake in a patient, the detector 18 detects emissions from the patient. The emissions occur from any location in a finite source (i.e., the patient).

The detected emission events, other functional information, or other scan data is stored in the memory 14. The data is stored in any format. The memory 14 is a buffer, cache, RAM, removable media, hard drive, magnetic, optical, database, or other now known or later developed memory. The memory 14 is a single device or group of two or more devices. The memory 14 is part of SPECT scanner 10 or a remote workstation or database, such as a PACS memory.

The SPECT scanner 10 is configured to reconstruct the imaged volume by applying a system matrix to the detected data. Any reconstruction may be used. The processor 12 is used to perform the reconstruction or the SPECT scanner 10 has another processor that performs the reconstruction. The SPECT scanner 10 accesses the detected emission events from the memory 14 to reconstruct.

The system matrix includes a 3D PRF model. The same or different SPECT scanner 10 is used to create the 3D PRF model. In one embodiment, the SPECT scanner 10 is configured to reconstruct with the 3D PRF representing detector response. In other embodiments, the SPECT scanner 10 is configured to create the 3D PRF in the first place as a self-similar 2D PRF with a scale as a function of distance.

The 3D PRF used by the SPECT scanner 10 in reconstruction or created by the SPECT scanner 10 is for a particular isotope. The PRF may be different for isotopes with different energy. The PRF is measured with the point source 22 being of the type of isotope. Similarly, the PRF is responsive to the collimator (e.g., size of holes, thickness of septal walls, depth of the holes/walls, and material). The 3D PRF is measured for and used for SPECT scanners 10 with the same type or construction of the collimator 20 and isotope.

The memory 14 may store data at different stages of processing, such as raw data representing detected events without further processing, filtered or thresholded data prior to reconstruction, reconstructed data, filtered reconstruction data, system matrix, projection data, thresholds, an image to be displayed, an already displayed image, or other data. The memory 14 or a different memory stores PRF measurements (e.g., detected emissions from the point source 22) and/or the self-similar 2D PRF and scale as a function of distance. For processing, the data bypasses the memory 14, is temporarily stored in the memory 14, or is loaded from the memory 14.

The memory 17 is additionally or alternatively a non-transitory computer readable storage medium with processing instructions. The memory 14 stores data representing instructions executable by the programmed processor 12. The instructions for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 12 is a general processor, digital signal processor, graphics processing unit, application specific integrated circuit, field programmable gate array, digital circuit, analog circuit, combinations thereof, or other now known or later developed device for processing emission information. The processor 12 is a single device, a plurality of devices, or a network. For more than one device, parallel or sequential division of processing may be used. Different devices making up the processor 12 may perform different functions, such as one processor (e.g., application specific integrated circuit or field programmable gate array) for reconstructing and another for extracting a 3D PRF from a representative 2D PRF and scale over distance. In one embodiment, the processor 12 is a control processor or other processor of SPECT scanner 10. In other embodiments, the processor 12 is part of a separate workstation or computer.

The processor 12 operates pursuant to stored instructions to perform various acts described herein, such as reconstructing, calculating the 3D PRF, determining scale as a function of distance, and generating a representative 2D PRF. The processor 12 is configured by software and/or hardware to perform, control performance, and/or receive data resulting from any or all of the acts of FIG. 1.

In one embodiment, the processor 12 is configured to determine a 3D PRF to be used by the SPECT scanner 10 and/or other SPECT scanners. The processor 12 receives emissions or detected intensity over the plane or 2D region of the detector 18 (e.g., 2D PRF) for the point source 22 at different distances, d. The processor 12 determines the scale as a function of distance. For example, widths of the 2D PRFs are determined by the processor 12. Any width measure may be used, such as a ratio of moments to intensity of the 2D PRF measured data. The processor 12 fits a polynomial (e.g., quadratic polynomial) to the widths. Since the widths are for 2D PRFs at different point source 22 distances, the fitted polynomial indicates the relative scaling over distance.

The processor 12 selects or generates a representative 2D PRF. For example, the 2D PRFs from the different distances are scaled to a particular distance based on the scale over distance. The scaled PRFs are averaged, summed, or otherwise composited to form a representative 2D PRF. A combination of 2D PRFs from different distances is used as the representative 2D PRF, but a single 2D PRF for one distance may be used as representative. The 2D PRFs used are from measured emissions rather than being models of the emissions.

In another embodiment, the processor 12 is configured to determine the 3D PRF from the representative 2D PRF and a plurality of scales for different distances from the detector 18. The representative 2D PRF and the scale are used to generate the 3D PRF during or before reconstruction. The 3D PRF represents a plurality of planes with respective 2D PRFs. Each 2D PRF is the representative 2D PRF as scaled for that plane. The distance of the plane from the detector 18 is used to scale the representative 2D PRF accordingly. The representative 2D PRF is spatially expanded or contracted in two dimensions based on the scale for the given distance.

The 3D PRF generated by the processor 12 is used by the processor 12 or another processer as part of the system matrix. The 3D PRF is used in reconstruction of emissions from a patient. The reconstructed information is used to generate an image of uptake or function of the patient.

The display 16 is a CRT, LCD, plasma screen, projector, printer, or other output device for showing an image. The display 16 displays an image of the reconstructed functional volume. The uptake function of the tissues of the patient is represented in the image. Multiplanar reconstruction, 3D rendering, or cross section imaging may be used to generate the image from the voxels of the reconstructed volume. Alternatively or additionally, an image of 2D or 3D PRF may be displayed.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method for estimating a point response function in single photon emission computed tomography (SPECT), the method comprising:
obtaining, with a detector of a SPECT system, point response functions of a point source at different distances from the detector;
fitting a polynomial to a characteristic of the point response functions as a function of the distances;

modeling scale as a function of distance with the polynomial as fit to the characteristic of the point response functions; and compositing the point response functions, resulting in a two-dimensional composite point response function;

wherein a three-dimensional point spread function of the detector is represented by the two-dimensional composite point response function and the modeled scale as the function of distance.

2. The method of claim 1 wherein obtaining comprises reading the detector response to the point source at the different distances with a collimator by the detector and a first radio-isotope for the point source; and further comprising applying the three-dimensional point spread function in reconstruction of emissions from patients in respective other SPECT systems using a same construction of collimators and a same isotope.

3. The method of claim 1 wherein fitting comprises calculating widths of the point response functions and fitting the polynomial to the widths.

4. The method of claim 3 wherein calculating the widths comprises calculating, for each point response function, a ratio of moments of image intensity.

5. The method of claim 1 wherein fitting comprises fitting a quadratic polynomial.

6. The method of claim 1 wherein modeling comprises indicating a scale value for each depth of the three-dimensional point spread function based on the polynomial, the scale value being an expansion or contraction in two dimensions of the two-dimensional composite point response function.

7. The method of claim 1 wherein compositing comprises scaling the point response functions to a common depth based on the modeling of the scale as a function of the distance and combining the scaled point response functions.

8. The method of claim 1 wherein a point spread for a depth of the three-dimensional point spread function is determined by scaling the two-dimensional composite point response function with the modeled scale.

9. The method of claim 1 further comprising verifying transverse shift invariance of the point response functions.

10. The method of claim 9 wherein verifying comprises imaging the point source at a plurality of different transverse locations at a same distance from the detector and testing for folding symmetry.

11. In a non-transitory computer readable storage medium having stored therein data representing instructions executable by a programmed processor for estimating a point response function in single photon emission computed tomography (SPECT), the storage medium comprising instructions for:

loading, for a collimator and an isotope, a self-similar two-dimensional point spread function and a polynomial of scale as a function of depth from a detector of a SPECT imager;

calculating a point spread function at a depth from the self-similar two-dimensional point spread function and the polynomial of scale as a function of depth; and applying the point spread function in SPECT reconstruction by the SPECT imager.

12. The non-transitory computer readable storage medium of claim 11 wherein calculating comprises scaling the self-similar two-dimensional point spread function to the depth and other depths as a function of the polynomial.

13. The non-transitory computer readable storage medium of claim 11 wherein the self-similar two-dimensional point spread function represents the point spread at another depth and where calculating comprises scaling as a function of the other depth and the depth relative to the polynomial.

14. The non-transitory computer readable storage medium of claim 11 wherein applying comprises performing the SPECT reconstruction with a three-dimensional point spread function calculated from the self-similar two-dimensional point spread function and the polynomial.

15. A system for estimating a point response function in single photon emission computed tomography (SPECT), the system comprising:

a single photon emission computed tomography scanner configured to reconstruct with a three-dimensional point spread function representing detector response of a detector; and a processor configured to determine the three-dimensional point spread function from a two-dimensional point spread function and a plurality of scales for different distances from the detector, the three-dimensional point spread function represented as a plurality of planes, each of the planes represented by the two-dimensional point spread function scaled by the scale for the distance from the plane to the detector.

16. The system of claim 15 wherein the two-dimensional point spread function comprises a measured point spread function with the detector or another detector.

17. The system of claim 15 wherein the two-dimensional point spread function comprises a combination of point spread functions from different distances after scaling.

18. The system of claim 15 wherein the scales for the different distances comprise a polynomial fit to a scale of measured data.

19. The system of claim 18 wherein the polynomial is fit from a ratio of moments to intensity of the measured data.

20. The system of claim 15 wherein the processor is configured to determine the three-dimensional point spread function by spatially expanding or contracting the two-dimensional point spread function based on the scales.

* * * * *